(12) United States Patent
Chiang et al.

(10) Patent No.: US 8,847,945 B2
(45) Date of Patent: Sep. 30, 2014

(54) STEREOSCOPIC DISPLAY DEVICE AND DISPLAY METHOD THEREOF

(71) Applicant: Chunghwa Picture Tubes, Ltd., Bade (TW)

(72) Inventors: Chih-yin Chiang, Nantou (TW); Che-wei Chang, Daxi Township, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 54 days.

(21) Appl. No.: 13/871,422

(22) Filed: Apr. 26, 2013

(65) Prior Publication Data
US 2014/0240303 A1 Aug. 28, 2014

(30) Foreign Application Priority Data

Feb. 26, 2013 (TW) .............................. 102106754 A (51) Int. Cl.
*G09G 5/00* (2006.01)
*G09G 3/36* (2006.01)
(52) U.S. Cl.
CPC ................................... *G09G 3/3696* (2013.01)
USPC ................ 345/212; 345/87; 345/55
(58) Field of Classification Search
CPC .......... G09G 3/18; G09G 3/36; G09G 3/3696
USPC ..................... 345/32, 38, 50, 55, 87, 212, 419
See application file for complete search history.

(56) References Cited

U.S. PATENT DOCUMENTS

| | | | |
|---|---|---|---|
| 8,159,529 B2 * | 4/2012 | Yoshida et al. ................... | 348/51 |
| 2011/0063533 A1 * | 3/2011 | Kim et al. .......................... | 349/15 |
| 2011/0164034 A1 * | 7/2011 | Bennett et al. ................. | 345/419 |
| 2011/0279749 A1 * | 11/2011 | Erinjippurath et al. ......... | 349/61 |
| 2011/0316881 A1 * | 12/2011 | Yoshifuji et al. ............... | 345/634 |
| 2012/0069000 A1 * | 3/2012 | Kim ............................... | 345/419 |
| 2012/0069015 A1 * | 3/2012 | Han et al. ....................... | 345/419 |

FOREIGN PATENT DOCUMENTS

TW 201125355 7/2011

* cited by examiner

*Primary Examiner* — Andrew Sasinowski
(74) *Attorney, Agent, or Firm* — Lowe Hauptman & Ham, LLP (57) ABSTRACT

Disclosed are a stereoscopic display device and a display method thereof. The stereoscopic display device includes a liquid crystal lens, a display panel, a driving voltage generation unit, and a control unit. The display panel has a display area. The display area includes at least one first two-dimensional display area and at least one hybrid display area. The hybrid display area includes at least one three-dimensional display area and at least one second two-dimensional display area. The control unit controls the first two-dimensional display area to display a first two-dimensional image, the three-dimensional display area to display a three-dimensional image, and the second two-dimensional display area to display a second two-dimensional image. The present invention is capable of displaying the two-dimensional images and the three-dimensional image simultaneously.

9 Claims, 5 Drawing Sheets

STEREOSCOPIC DISPLAY DEVICE AND DISPLAY METHOD THEREOF

CROSS-REFERENCE TO RELATED APPLICATION

This application claims priority from and the benefit under 35 U.S.C. §119(a) of Taiwanese Patent Application No. 102106754, filed on Feb. 26, 2013 in the TIPO (Taiwan Intellectual Property Office), which is hereby incorporated by reference for all purposes as if fully set forth herein.

BACKGROUND OF THE INVENTION

1. Field of the Invention

The present invention generally relates to a stereoscopic display device, and more particularly to a stereoscopic display device and a display method thereof.

2. Description of Prior Art

Figure 1:
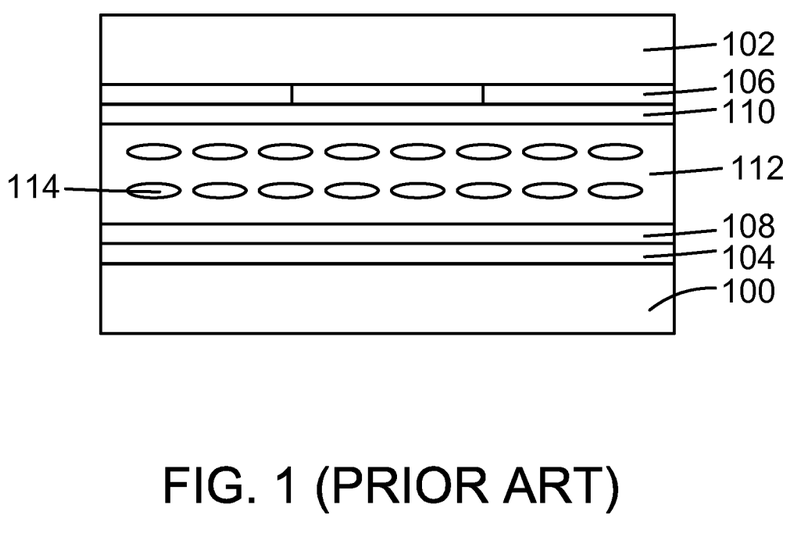
FIG. 1 illustrates a liquid crystal lens.

Please refer to FIG. 1, which illustrates a liquid crystal lens (LC lens). The liquid crystal lens comprises two glass substrates 100, 102, two indium tin oxide layers (ITO layers) 104, 106, two alignment layers 108, 110 and a liquid crystal layer 112. In the liquid crystal lens, a voltage is applied to the two indium tin oxide layers 104, 106, such that liquid crystals 114 of the liquid crystal layer 112 has characteristics of refractive index changes, such as a gradient refractive index lens (GRIN lens).

Figure 2A:
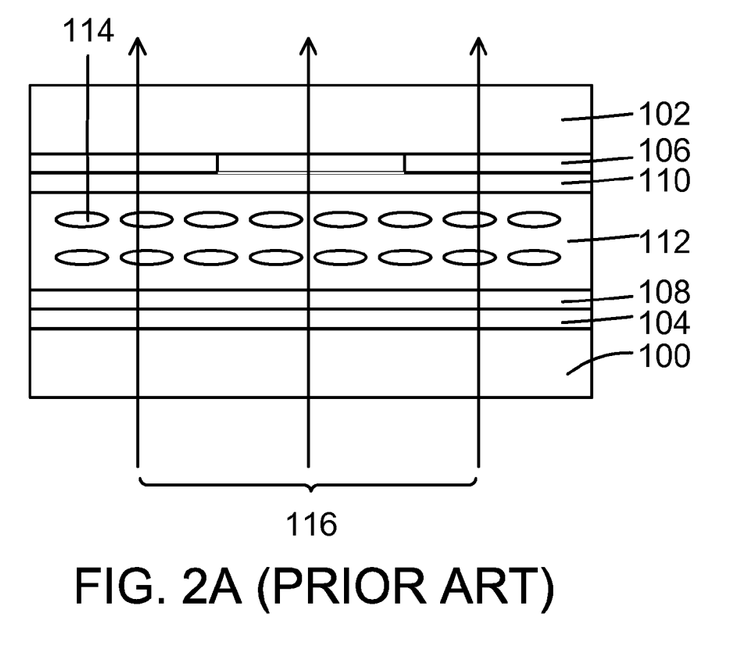
FIG. 2A and FIG. 2B respectively illustrate that no driving voltage is applied to the liquid crystal lens and a driving voltage is applied to the liquid crystal lens.
Figure 2B:
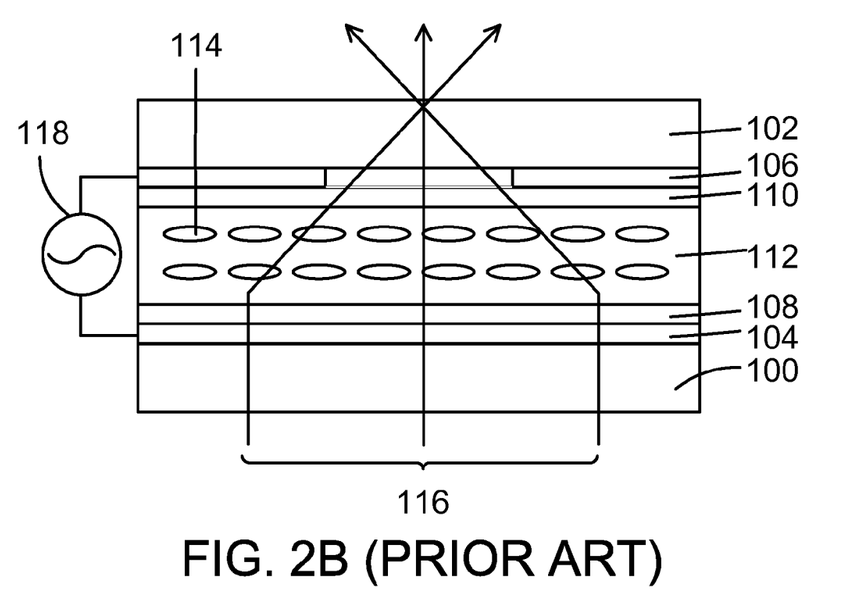

Please refer to FIG. 2A and FIG. 2B, which respectively illustrate that no driving voltage is applied to the liquid crystal lens and a driving voltage is applied to the liquid crystal lens. As shown in FIG. 2A, when no driving voltage is applied to the two indium tin oxide layers 104, 106, a long axis of the liquid crystals is oriented by the alignment layers 108, 110. When light waves 116 pass through the liquid crystals 114, a phase thereof is not changed. When the driving voltage 118 is applied to the indium tin oxide layers 104, 106, different electric field distributions are formed due to different potentials between the indium tin oxide layers 104, 106. Fringing field effect in edges of the indium tin oxide layers 104, 106 causes the electric fields to have gradient changes. The liquid crystals 114 are affected by the electric fields, and finally the long axis of the liquid crystals 114 is oriented by the electric fields. When the light waves 116 pass through the liquid crystals 114, the phase thereof is changed with the refractive index changes of the liquid crystals 114 and the light waves 116 are focused. Since the change of the phase of the light waves 116 is similar to a lens, the structure in FIG. 2B is called as the liquid crystal lens.

The above-mentioned liquid crystal lens together with a display panel (not shown) may be served as a two-dimensional/three-dimensional (2D/3D) image switching display device. When no driving voltage is applied as shown in FIG. 2A, light waves which are emitted by the display panel (not shown) are not affected by the liquid crystals 114 and the phase thereof is not changed. Accordingly, a two-dimensional image can be displayed. When a driving voltage 118 is applied as shown in FIG. 2B, the light waves which are emitted by the display panel (not shown) are affected by the liquid crystals 114 and the phase thereof is changed. Since the liquid crystals 114 have optical characteristics similar to the lens, human eyes of a viewer can observe different images after the light waves are split. As a result, an object of displaying a three-dimensional image can be achieved.

A conventional three-dimensional display device is designed for being utilized in a full-screen mode. However, a user interfaces which is displayed by a popular operating system is still a two-dimensional image. When a movie which is observed by the observer is not in the full-screen mode and a three-dimensional mode is started, the user interface (two-dimensional image) is blurred because the user interface (two-dimensional image) is in the three-dimensional mode. Although the problem that the user interface is blurred may be solved by utilizing the above-mentioned liquid crystal lens and switching the liquid crystal lens to be in a two-dimensional mode, system multiplexing operations cannot be performed. That is, the operation of displaying the two-dimensional image in the two-dimensional mode and the operation of displaying the three-dimensional image in the three-dimensional mode cannot be performed simultaneously.

Consequently, there is a need to solve the problem that the two-dimensional image and the three-dimensional image cannot be displayed simultaneously.

SUMMARY OF THE INVENTION

An object of the present invention is to provide a stereoscopic display device and a display method thereof capable of solving the problem that the two-dimensional image and the three-dimensional image cannot be displayed simultaneously.

The other object of the present invention is to provide a stereoscopic display device. The stereoscopic display device comprises a liquid crystal lens, a display panel, a driving voltage generation unit, and a control unit. The liquid crystal lens comprises a first substrate, a second substrate disposed corresponding to the first substrate, a first electrode layer disposed on the first substrate and facing the second substrate, a second electrode layer disposed on the second substrate and facing the first substrate, and a liquid crystal layer disposed between the first electrode layer and the second electrode layer. The second electrode layer comprises a plurality of strip-shaped electrodes. The strip-shaped electrodes are electrically coupled to respective switches. The liquid crystal lens is disposed on the display panel. The display panel has a display area. The display area is corresponding to the first electrode layer and the second electrode layer and comprises at least one first two-dimensional display area and at least one hybrid display area. The hybrid display area comprises at least one three-dimensional display area and at least one second two-dimensional display area. The driving voltage generation unit is electrically coupled to the first electrode layer and the second electrode layer. The control unit is electrically coupled to the display panel and the driving voltage generation unit. The control unit controls the first two-dimensional display area of the display panel to display a first two-dimensional image. The control unit turns on the switches of the strip-shaped electrodes corresponding to the hybrid display area, controls the driving voltage generation unit to apply a driving voltage between the first electrode layer and the strip-shaped electrodes of the second electrode layer corresponding to the hybrid display area, controls the three-dimensional display area to display a three-dimensional image and controls the second two-dimensional display area to display a second two-dimensional image.

Another object of the present invention is to provide a display method of a stereoscopic display device. The stereoscopic display device comprises a liquid crystal lens, a display panel, a driving voltage generation unit and a control unit. The liquid crystal lens is disposed on the display panel and comprises a first substrate, a second substrate disposed corresponding to the first substrate, a first electrode layer disposed on the first substrate and facing the second substrate, a second electrode layer disposed on the second substrate and facing the first substrate, and a liquid crystal layer disposed between the first electrode layer and the second electrode layer. The second electrode layer comprises a plurality of strip-shaped electrodes. The strip-shaped electrodes are electrically coupled to respective switches. The display panel has a display area. The display area comprises at least one first two-dimensional display area and at least one hybrid display area. The hybrid display area comprises at least one three-dimensional display area and at least one second two-dimensional display area. The display area is corresponding to the first electrode layer and the second electrode layer. The display method comprises: the control unit turning on the switches of the strip-shaped electrodes corresponding to the hybrid display area and controlling the driving voltage generation unit to apply a driving voltage between the first electrode layer and the strip-shaped electrodes of the second electrode layer corresponding to the hybrid display area; the control unit controlling the first two-dimensional display area of the display panel to display a first two-dimensional image; the control unit controlling the three-dimensional display area to display a three-dimensional image; and the control unit controlling the second two-dimensional display area to display a second two-dimensional image.

The stereoscopic display device and the display method thereof in accordance with the present invention are capable of displaying the two-dimensional image and the three-dimensional image simultaneously, thereby achieving a multiplexing objective and solving the problem that the two-dimensional image which is displayed in the three-dimensional mode is blurred in the prior arts. Furthermore, since the driving voltage is applied only to the first electrode and the second electrode corresponding to the hybrid display area instead of the whole first electrode layer and the whole second electrode layer. Accordingly, an objective of energy saving can be achieved.

DETAILED DESCRIPTION OF THE INVENTION

Figure 3:
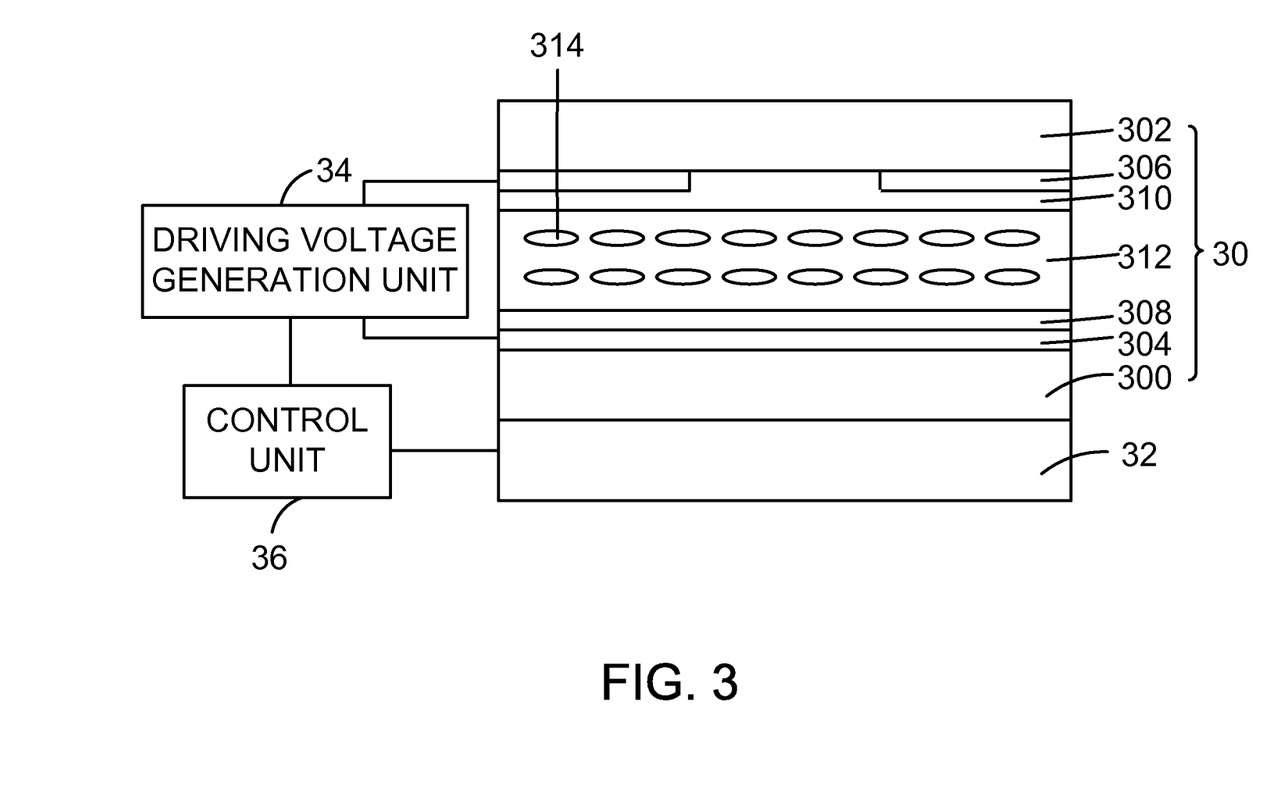
FIG. 3 illustrates a stereoscopic display device in accordance with a preferred embodiment of the present invention.

Please refer to FIG. 3, which illustrates a stereoscopic display device in accordance with a preferred embodiment of the present invention.

The stereoscopic display device comprises a liquid crystal lens 30, a display panel 32, a driving voltage generation unit 34 and a control unit 36. The liquid crystal lens 30 is disposed on the display panel 32. The driving voltage generation unit 34 is electrically coupled to the liquid crystal lens 30 for generating a driving voltage to drive the liquid crystal lens 30, such that a liquid crystal layer 312 of the liquid crystal lens 30 has characteristics of refractive index changes, such as a gradient refractive index lens. The control unit 36 is electrically coupled to the display panel 32 and the driving voltage generation unit 34.

The liquid crystal lens 30 comprises a first substrate 300, a second substrate 302, a first electrode layer 304, a second electrode layer 306, a first alignment layer 308, a second alignment layer 310 and the liquid crystal layer 312.

Figure 4:
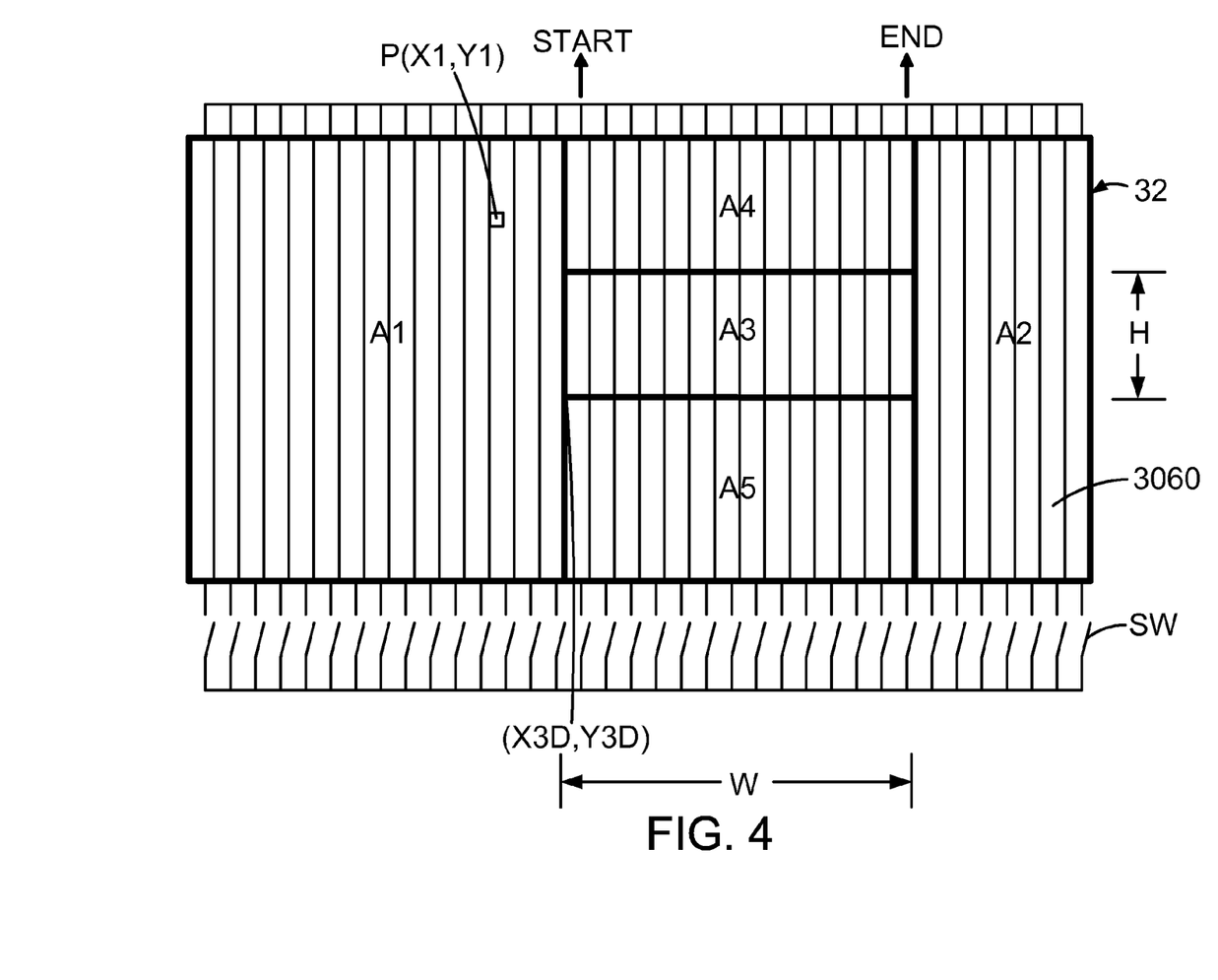
FIG. 4 illustrates a corresponding diagram of a display area of a display panel versus strip-shaped electrodes of a second electrode layer.

The second substrate 302 is disposed corresponding to the first substrate 300. The first electrode layer 304 is disposed on the first substrate 300 and faces the second substrate 302. The second electrode layer 306 is disposed on the second substrate 302 and faces the first substrate 300. In the present embodiment, the first electrode layer 304 covers the first substrate 300, while the second electrode layer 306 comprises a plurality of strip-shaped electrodes 3060 (as shown in FIG. 4). The first electrode layer 304 and the second electrode layer 306 may be made of indium tin oxide (ITO). The first alignment layer 308 is disposed between the first electrode layer 304 and the liquid crystal layer 312. The second alignment layer 310 is disposed between the second substrate 302 and the liquid crystal layer 312. The liquid crystal layer 312 comprises a plurality of liquid crystals 314.

More particularly, the driving voltage generation unit 34 is electrically coupled to the first electrode layer 304 and the second electrode layer 306.

Please refer to FIG. 3 and FIG. 4. FIG. 4 illustrates a corresponding diagram of a display area of the display panel 32 versus the strip-shaped electrodes 3060 of the second electrode layer 306. The display area comprises at least one first two-dimensional display area (represented as A1, A2) and at least one hybrid display area. The hybrid display area comprises at least one three-dimensional display area A3 and at least one second two-dimensional display area (represented as A4, A5). The first two-dimensional display areas A1, A2, the three-dimensional display area A3 of the hybrid display area and the second two-dimensional display areas A4, A5 are corresponding to the first electrode layer 304 and the second electrode layer 306. The display panel 32 comprises a plurality of pixels P. A width of one strip-shaped electrode 3060 is approximately equal to a width including 2-3 pixels P. Each strip-shaped electrode 3060 is electrically coupled to the control unit 36. A control method will be described in detail later.

In a general case (without displaying a three-dimensional image), all display areas including the first two-dimensional display areas A1, A2, the three-dimensional display area A3, and the second two-dimensional display areas A4, A5 display a user interface of an operating system (e.g. desktop of Windows). When a player is started to play a three-dimensional image (stereoscopic movie), the present invention is capable of displaying the three-dimensional image in the three-dimensional display area A3 (e.g. a position of the player which plays the stereoscopic movie) and displaying the two-dimensional image (e.g. desktop of Windows) in the first two-dimensional display areas A1, A2 and the second two-dimensional display areas A4, A5, thereby achieving an object of displaying the two-dimensional image and the three-dimensional image simultaneously.

The first two-dimensional display areas A1, A2 are required to display the two-dimensional image, that is, the first electrode layer 304 and the strip-shaped electrodes 3060 of the second electrode layer 306 corresponding to the first two-dimensional display areas A1, A2 are required to be driven in the two-dimensional mode as shown in FIG. 2A. Accordingly, the control unit 36 controls the driving voltage generation unit 34 not to apply a driving voltage between the first electrode layer 304 and the strip-shaped electrodes 3060 of the second electrode layer 306 corresponding to the first two-dimensional display areas A1, A2. The control unit 36 further controls the first two-dimensional display areas A1, A2 to display a first two-dimensional image.

The three-dimensional display area A3 is required to display the three-dimensional image, that is, the first electrode layer 304 and the strip-shaped electrodes 3060 of the second electrode layer 306 corresponding to the three-dimensional display area A3 are required to be driven in the three-dimensional mode as shown in FIG. 2B. Accordingly, the control unit 36 controls the driving voltage generation unit 34 to apply the driving voltage between the first electrode layer 304 and the strip-shaped electrodes 3060 of the second electrode layer 306 corresponding to the three-dimensional display area A3. The control unit 36 further controls the three-dimensional display area A3 to display the three-dimensional image. After data of odd pixels and data of even pixels are alternately arranged, the data of odd pixels and the data of even pixels are displayed with the principle in FIG. 2B. Accordingly, two eyes can respectively observe images of the data of odd pixels and the data of the even pixels for perceiving the three-dimensional image.

As mentioned above, the control unit 36 controls the driving voltage generation unit 34 to apply the driving voltage between the first electrode layer 304 and the strip-shaped electrodes 3060 of the second electrode layer 306 corresponding to the three-dimensional display area A3, such that the three-dimensional display area A3 can display the three-dimensional image as shown in FIG. 2B. However, since the first electrode layer 304 and the strip-shaped electrodes 3060 of the second electrode layer 306 to which the driving voltage is applied are also corresponding to the second two-dimensional display areas A4, A5 (i.e. the second two-dimensional display areas A4, A5 are also controlled by the driving voltage), the second two-dimensional display areas A4, A5 display a second two-dimensional image in the three-dimensional mode. That is, data of the second two-dimensional image required to be displayed is divided into data of odd pixels and data of even pixels and the data of the odd pixels and data of the even pixels are displayed with the principle in FIG. 2B. Two eyes respectively observe different images, and thus the second two-dimensional image cannot be fused correctly (in fact, two eyes should observe the same image and fuse the same image into the second two-dimensional image). As a result, the problem that the second two-dimensional image is blurred in the prior arts occurs.

In order to solve the problem that the second two-dimensional display areas A4, A5 display the second two-dimensional image (user interface of the operating system) in the three-dimensional mode rather than in the two-dimensional mode, the present invention processes the second two-dimensional image which is required to be displayed in the second two-dimensional display areas A4, A5. The control unit 36 of the present invention copies the data of the odd pixels in the second two-dimensional display areas A4, A5 to the data of the even pixels, so as to control all pixels in the second two-dimensional display areas A4, A5 to display the data of the odd pixels. As a result, although the second two-dimensional display areas A4, A5 are driven in the three-dimensional mode as shown in FIG. 2B, two eyes observe the same data (i.e. data of the odd pixels) in fact and can fuse the same data into the correct second two-dimensional image.

Certainly, the control unit 36 of the present invention also can copies the data of even pixels in the second two-dimensional display areas A4, A5 to the data of the odd pixels, so as to control all pixels in the second two-dimensional display areas A4, A5 to display the data of the even pixels. As a result, although the second two-dimensional display areas A4, A5 are driven in the three-dimensional mode as shown in FIG. 2B, two eyes observe the same data (i.e. data of the even pixels) in fact and can fuse the same data into the correct second two-dimensional image.

In the present embodiment, the first electrode layer 304 covers the first substrate 300, while the second electrode layer 306 comprises the strip-shaped electrodes 3060. Accordingly, applying the driving voltage between the first electrode layer 304 and the strip-shaped electrodes 3060 of the second electrode layer 306 refers to apply the driving voltage to the strip-shaped electrodes 3060 of the second electrode layer 306 for controlling the display area required to be operated in the three-dimensional mode. The control unit 36 may acquire a position of the hybrid display area according to an indicative data from a system (e.g. a video card), thereby controlling the strip-shaped electrodes 3060 which is required to be driven by the driving voltage. For instance, a format of the indicative data is (START, END), which represents that the driving voltage is required to be applied to the strip-shaped electrodes 3060 between START and END (i.e. corresponding to the three-dimensional display area A3 required to display the three-dimensional image). After the control unit 36 receives the indicative data, the control unit 36 controls the driving voltage generation unit 34 to apply the driving voltage to the strip-shaped electrodes 3060 between START and END (i.e. corresponding to the three-dimensional display area A3 required to display the three-dimensional image). The driving voltage is not applied to the strip-shaped electrodes 3060 in the left of START and in the right of END.

In the present embodiment, the strip-shaped electrodes 3060 are electrically coupled to respective switches SW. The control unit 36 controls whether the driving voltage is applied to the strip-shaped electrodes 3060 or not by controlling the switches SW of the strip-shaped electrodes 3060.

Please refer to FIG. 3 and FIG. 4. A coordinate of the pixel P is defined as (X1, Y1). A coordinate at a lower left corner of the three-dimensional display area A3 is defined as (X3D, Y3D). X1 and X3D are coordinates in an X direction, while Y1 and Y3D are coordinates in a Y direction. A width and a height of the three-dimensional display area A3 are defined as W and H. The coordinate, the width and the height of the three-dimensional display area A3 may be provided by the system (e.g. a video card) or detected by the control unit 36.

The pixel P is determined to be corresponding to one of the first two-dimensional display areas A1, A2, the three-dimensional display area A3, and the second two-dimensional display areas A4, A5. More particularly, when X1<X3D or X1>(X3D+W), the pixel P is determined to be corresponding to one of the first two-dimensional display areas A1, A2. The pixel data of the pixel P is not changed.

When X3D<X1<(X3D+W) and Y3D<Y1<(Y3D+H), the pixel P is determined to be corresponding to the three-dimensional display area A3. The pixel data of the pixel P is processed with the three-dimensional mode. After the data of the odd pixels and data of the even pixels in the three-dimensional display area A3 are alternately arranged, the data of the odd pixels and the data of the even pixels in the three-dimensional display area A3 are displayed with the principle in FIG. 2B.

When X3D<X1<(X3D+W) and Y1>(Y3D+H) (corresponding to the second two-dimensional display area A4) or X3D<X1<(X3D+W) and Y1<Y3D (corresponding to the second two-dimensional display area A5), the data of the odd pixels in the second two-dimensional display areas A4, A5 is copied to the data of the even pixels, such that all of the pixels in the second two-dimensional display areas A4, A5 display the data of the odd pixels. Certainly, the control unit 36 can also copy the data of the even pixels in the second two-dimensional display areas A4, A5 to the data of the odd pixels, such that all of the pixels in the second two-dimensional display areas A4, A5 display the data of the even pixels. Accordingly, although the second two-dimensional display areas A4, A5 are driven in the three-dimensional mode as shown in FIG. 2B, two eyes observe the same data and can fuse the same data to the correct second two-dimensional image.

Figure 5:
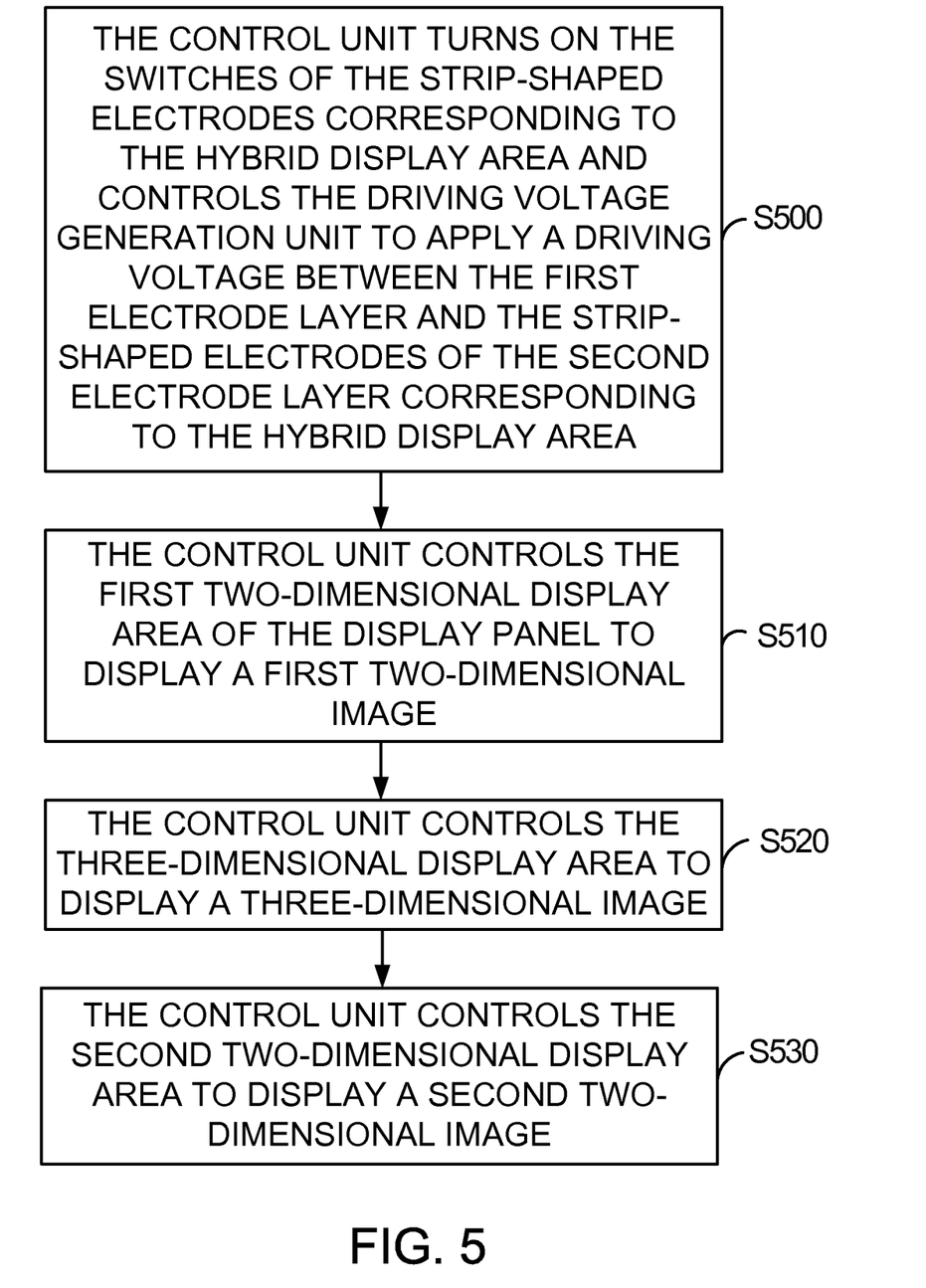
FIG. 5 illustrates a flow chart of a display method of a stereoscopic display device in accordance with the present invention.

Please refer to FIG. 5, which illustrates a flow chart of a display method of a stereoscopic display device in accordance with the present invention. The stereoscopic display device comprises a liquid crystal lens, a display panel, a driving voltage generation unit and a control unit. The liquid crystal lens is disposed on the display panel and comprises a first substrate, a second substrate disposed corresponding to the first substrate, a first electrode layer disposed on the first substrate and facing the second substrate, a second electrode layer disposed on the second substrate and facing the first substrate, and a liquid crystal layer disposed between the first electrode layer and the second electrode layer. The second electrode layer comprises a plurality of strip-shaped electrodes. The strip-shaped electrodes are electrically coupled to respective switches. The display panel has a display area. The display area comprises at least one first two-dimensional display area and at least one hybrid display area. The hybrid display area comprises at least one three-dimensional display area and at least one second two-dimensional display area. The display area is corresponding to the first electrode layer and the second electrode layer. The display method comprises the following steps.

In step S500, the control unit turns on the switches of the strip-shaped electrodes corresponding to the hybrid display area and controls the driving voltage generation unit to apply a driving voltage between the first electrode layer and the strip-shaped electrodes of the second electrode layer corresponding to the hybrid display area.

In step S510, the control unit controls the first two-dimensional display area of the display panel to display a first two-dimensional image.

In step S520, the control unit controls the three-dimensional display area to display a three-dimensional image. The control unit acquires a position of the three-dimensional display area according to an indicative data.

In step S530, the control unit controls the second two-dimensional display area to display a second two-dimensional image. The display panel comprises a plurality of pixels. The pixels are divided into a plurality of odd pixels and a plurality of even pixels. In one embodiment, the control unit copies pixel data of the odd pixels to pixel data of the even pixels for forming the second two-dimensional image. In another embodiment, the control unit copies pixel data of the even pixels to pixel data of the odd pixels for forming the second two-dimensional image.

The stereoscopic display device and the display method thereof in accordance with of the present invention are capable of displaying the two-dimensional image and the three-dimensional image simultaneously, thereby achieving a multiplexing objective and solving the problem that the two-dimensional image which is displayed in the three-dimensional mode is blurred in the prior arts. Furthermore, the three-dimensional image in the three-dimensional display area is superimposed on the two-dimensional image, and thus stereoscopic effect of the three-dimensional image is improved. Finally, since the driving voltage is applied only to the first electrode and the second electrode corresponding to the hybrid display area instead of the whole first electrode layer and the whole second electrode layer. Accordingly, an objective of energy saving can be achieved.

What is claimed is:

1. A stereoscopic display device, comprising:
   a liquid crystal lens, comprising a first substrate, a second substrate disposed corresponding to the first substrate, a first electrode layer disposed on the first substrate and facing the second substrate, a second electrode layer disposed on the second substrate and facing the first substrate, and a liquid crystal layer disposed between the first electrode layer and the second electrode layer, the second electrode layer comprising a plurality of strip-shaped electrodes, the strip-shaped electrodes electrically coupled to respective switches;
   a display panel, the liquid crystal lens disposed on the display panel, the display panel having a display area, the display area corresponding to the first electrode layer and the strip-shaped electrodes of the second electrode layer and comprising at least one first two-dimensional display area and at least one hybrid display area, the hybrid display area comprising at least one three-dimensional display area and at least one second two-dimensional display area;
   a driving voltage generation unit, electrically coupled to the first electrode layer and the second electrode layer; and
   a control unit, electrically coupled to the display panel and the driving voltage generation unit,
   wherein the control unit controls the first two-dimensional display area of the display panel to display a first two-dimensional image,
   the control unit turns on the switches of the strip-shaped electrodes corresponding to the hybrid display area, controls the driving voltage generation unit to apply a driving voltage between the first electrode layer and the strip-shaped electrodes of the second electrode layer corresponding to the hybrid display area, controls the three-dimensional display area to display a three-dimensional image and controls the second two-dimensional display area to display a second two-dimensional image.

2. The device of claim 1, wherein the first electrode layer covers the first substrate.

3. The device of claim 1, wherein the display panel comprises a plurality of pixels, the pixels are divided into a plurality of odd pixels and a plurality of even pixels, and the control unit copies pixel data of the odd pixels to pixel data of the even pixels for forming the second two-dimensional image.

4. The device of claim 1, wherein the display panel comprises a plurality of pixels, the pixels are divided into a plurality of odd pixels and a plurality of even pixels, and the control unit copies pixel data of the even pixels to pixel data of the odd pixels for forming the second two-dimensional image.

5. The device of claim 1, wherein the control unit acquires a position of the three-dimensional display area according to an indicative data.

6. A display method of a stereoscopic display device, the stereoscopic display device comprising a liquid crystal lens, a display panel, a driving voltage generation unit and a control unit, the liquid crystal lens disposed on the display panel and comprising a first substrate, a second substrate disposed corresponding to the first substrate, a first electrode layer disposed on the first substrate and facing the second substrate, a second electrode layer disposed on the second substrate and facing the first substrate, and a liquid crystal layer disposed between the first electrode layer and the second electrode layer, the second electrode layer comprising a plurality of strip-shaped electrodes, the strip-shaped electrodes electrically coupled to respective switches, the display panel having a display area, the display area comprising at least one first two-dimensional display area and at least one hybrid display area, the hybrid display area comprising at least one three-dimensional display area and at least one second two-dimensional display area, the display area corresponding to the first electrode layer and the second electrode layer, the display method comprising:

- the control unit turning on the switches of the strip-shaped electrodes corresponding to the hybrid display area and controlling the driving voltage generation unit to apply a driving voltage between the first electrode layer and the strip-shaped electrodes of the second electrode layer corresponding to the hybrid display area;
- the control unit controlling the first two-dimensional display area of the display panel to display a first two-dimensional image;
- the control unit controlling the three-dimensional display area to display a three-dimensional image; and
- the control unit controlling the second two-dimensional display area to display a second two-dimensional image.

7. The method of claim 6, wherein the display panel comprises a plurality of pixels, the pixels are divided into a plurality of odd pixels and a plurality of even pixels, and the control unit copies pixel data of the odd pixels to pixel data of the even pixels for forming the second two-dimensional image.

8. The method of claim 6, wherein the display panel comprises a plurality of pixels, the pixels are divided into a plurality of odd pixels and a plurality of even pixels, and the control unit copies pixel data of the even pixels to pixel data of the odd pixels for forming the second two-dimensional image.

9. The method of claim 6, wherein the control unit acquires a position of the three-dimensional display area according to an indicative data.

* * * * *